(12) United States Patent
Sutherland et al.

(10) Patent No.: US 11,221,314 B2
(45) Date of Patent: Jan. 11, 2022

(54) COMBINED PULSE ECHO INSPECTION OF PIPELINE SYSTEMS

(71) Applicant: Baker Hughes Oilfield Operations LLC, Houston, TX (US)

(72) Inventors: Jeffrey Earle Sutherland, Calgary (CA); Ryan Danny Eastcott, Calgary (CA)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 523 days.

(21) Appl. No.: 15/761,691

(22) PCT Filed: Sep. 20, 2016

(86) PCT No.: PCT/US2016/052705
§ 371 (c)(1),
(2) Date: Mar. 20, 2018

(87) PCT Pub. No.: WO2017/049326
PCT Pub. Date: Mar. 23, 2017

(65) Prior Publication Data
US 2018/0356370 A1  Dec. 13, 2018

Related U.S. Application Data

(60) Provisional application No. 62/221,067, filed on Sep. 20, 2015.

(51) Int. Cl.
*G01N 29/26*  (2006.01)
*G01N 29/265*  (2006.01)
(Continued)

(52) U.S. Cl.
CPC ........... *G01N 29/262* (2013.01); *G01N 29/11* (2013.01); *G01N 29/265* (2013.01);
(Continued)

(58) Field of Classification Search
CPC .... G01N 29/262; G01N 29/11; G01N 29/265; G01N 29/4427; G01N 2291/044;
(Continued)

(56) References Cited

U.S. PATENT DOCUMENTS 2,959,054 A  11/1960  Welkowitz
2,966,058 A  12/1960  McSkimin
(Continued)

FOREIGN PATENT DOCUMENTS

DE  195 35 848 C1  7/1996
EP  0 364 168 A2  4/1990
(Continued)

OTHER PUBLICATIONS

International Search Report and Written Opinion issued in connection with corresponding PCT Application No. PCT/US16/52705 dated Dec. 15, 2016.
(Continued)

*Primary Examiner* — Lisa M Caputo
*Assistant Examiner* — Rose M Miller
(74) *Attorney, Agent, or Firm* — Mintz Levin Cohn Ferris Glovsky and Popeo, PC; Lisa Adams

(57) ABSTRACT

In accordance with an embodiment, a method for inspecting pipe is provided. The method includes transmitting an ultrasound pulse through a pipe or a fluid container from inside the pipe or the fluid container. The method further includes receiving echoes via a plurality of sensors, based on the ultrasound pulse, and combining echo data from the plurality of sensors. The method additionally includes deriving an environmental assessment based on the combining the echo data.

13 Claims, 10 Drawing Sheets

(51) Int. Cl.
*G01N 29/11* (2006.01)
*G01N 29/44* (2006.01)

(52) U.S. Cl.
CPC ... *G01N 29/4427* (2013.01); *G01N 2291/044* (2013.01); *G01N 2291/106* (2013.01); *G01N 2291/2636* (2013.01)

(58) Field of Classification Search
CPC ..... G01N 2291/106; G01N 2291/2636; G01N 2291/051
USPC ......... 73/592, 622, 623, 620, 625, 626, 627, 73/628, 641
See application file for complete search history.

(56) References Cited

U.S. PATENT DOCUMENTS

| | | | |
|---|---|---|---|
| 4,964,059 A | 10/1990 | Sugaya et al. | |
| 5,460,046 A | 10/1995 | Maltby et al. | |
| 5,681,995 A * | 10/1997 | Ooura | G01N 29/11 376/249 |
| 5,770,800 A | 6/1998 | Jenkins et al. | |
| 6,666,095 B2 | 12/2003 | Thomas et al. | |
| 6,763,698 B2 | 7/2004 | Greenwood | |
| 8,265,886 B2 | 9/2012 | Bisiaux et al. | |
| 2006/0219011 A1 * | 10/2006 | Siddu | G01N 29/11 73/597 |
| 2009/0084184 A1 * | 4/2009 | Dijkstra | G01N 29/225 73/623 |
| 2010/0199767 A1 * | 8/2010 | Ganin | G01N 29/2412 73/623 |
| 2011/0167914 A1 * | 7/2011 | Sutherland | G01N 29/2412 73/643 |
| 2014/0238136 A1 | 8/2014 | Ten Grotenhuis et al. | |
| 2016/0327519 A1 * | 11/2016 | Mayo | G01N 29/348 |

FOREIGN PATENT DOCUMENTS

| | | |
|---|---|---|
| EP | 2 843 401 A1 | 3/2015 |
| WO | 2013/059458 A1 | 4/2013 |

OTHER PUBLICATIONS

International Preliminary Report on Patentability issued in connection with corresponding PCT Application No. PCT/US16/52705 dated Mar. 20, 2018.

* cited by examiner

COMBINED PULSE ECHO INSPECTION OF PIPELINE SYSTEMS

BACKGROUND

Certain equipment and facilities utilize pipeline systems having pipes or conduits to transport fluids or products, e.g. hydrocarbonic fluids, over distances. However, certain products may leak out of the pipes, leading to product loss, corrosion, pitting, and other unwanted conditions. Visual inspection of the pipe leakage may be very difficult. In some pipeline systems, the pipe may include long "runs" having, tens, hundreds, if not thousands of miles. The need thus exists for improved systems and methods for inspecting for certain conditions and anomalies within a pipeline system.

BRIEF DESCRIPTION

The subject matter disclosed herein relates to combined pulse echo techniques as applied to inspection of pipeline systems.

Certain embodiments commensurate in scope with the disclosure are summarized below. These embodiments are not intended to limit the scope of the disclosure, but rather these embodiments are intended only to provide a brief summary of possible forms of the disclosed subject matter. Indeed, the disclosed subject matter may encompass a variety of forms that may be similar to or different from the embodiments set forth below.

In accordance with a first embodiment, a method for inspecting pipe is provided. The method includes transmitting an ultrasound pulse through a pipe or a fluid container from inside the pipe or the fluid container. The method further includes receiving echoes via a plurality of sensors, based on the ultrasound pulse, and combining echo data from the plurality of sensors. The method additionally includes deriving an environmental assessment based on the combining the echo data.

In accordance with a second embodiment, a system is provided. The system includes an ultrasound transmitter and receiver system comprising a plurality of sensors, and a processor. The processor is configured to transmit an ultrasound pulse via the ultrasound transmitter and receiver system. The processor is also configured to receive echo data via the plurality of sensors, based on the ultrasound pulse. The processor is additionally configured to combine the echo data from the plurality of sensors. The processor is further configured to derive an environmental assessment based on the combining the echo data.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein.

DETAILED DESCRIPTION

Figure 1:
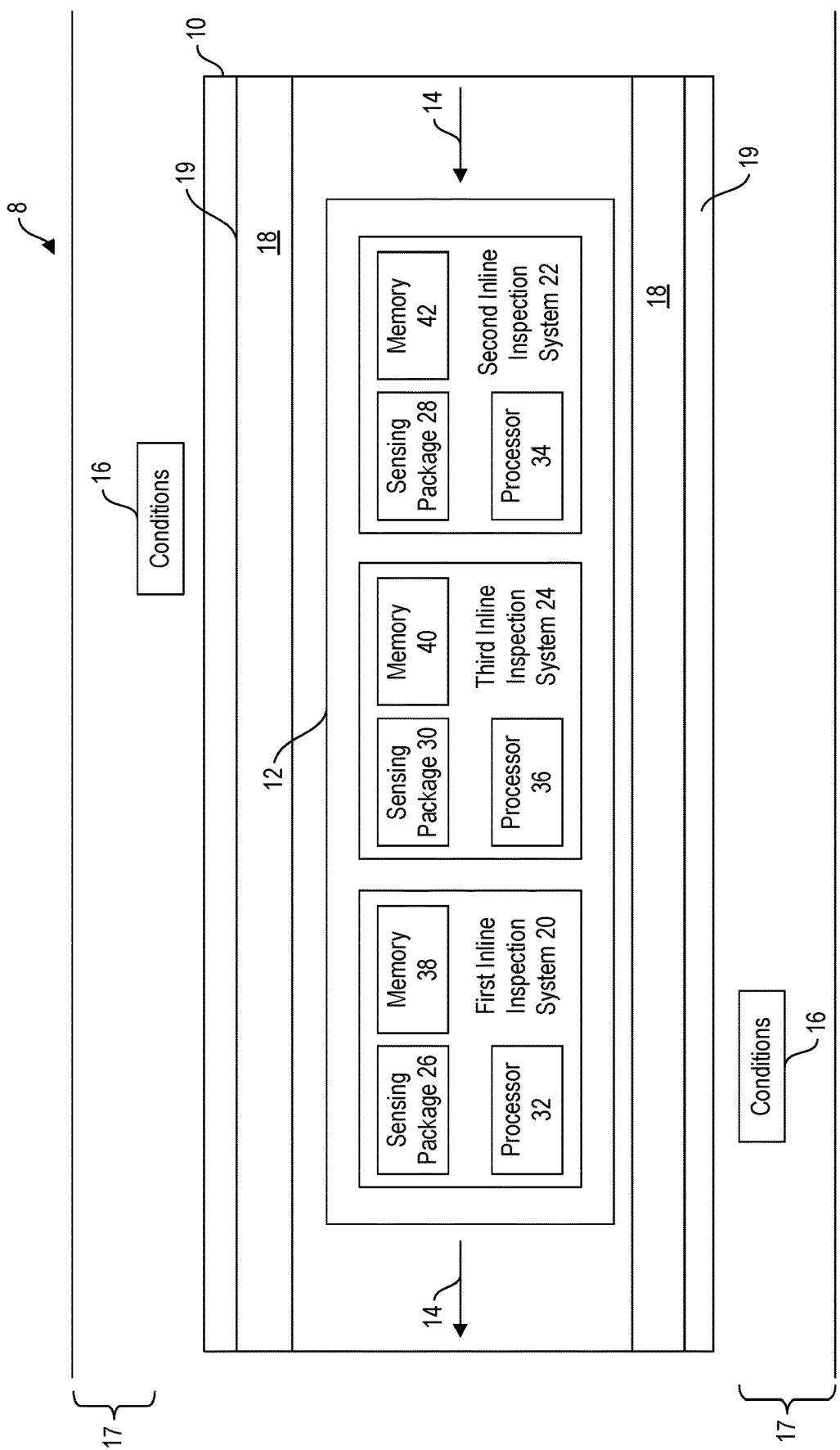
FIG. 1 is a block diagram of an embodiment of a pipeline system having a pipeline inspection system.

One or more specific embodiments of the present disclosed subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the disclosed subject matter, the articles "a," "an," "the," and "said" are intended to mean that there are one or more of the elements. The terms "comprising," "including," and "having" are intended to be inclusive and mean that there may be additional elements other than the listed elements.

The present disclosure is directed towards systems and methods for improving inspection of pipeline system by combining data processing and/or hardware systems from a plurality of pulse echo transmitters and sensors. The pulse echo transmitters and sensors may each apply one or more pulse echo techniques suitable for deriving conditions such as the coating status of pipe, and the environment surround the pipe (e.g., moisture content in the environment, type of environment, properties of the environment). Data received via the plurality of sensors (e.g., 3, 4, 5, 6, 10, 100 or more sensors) may then be processed and combined, as described in more detail below, to derive more a more accurate inspection of the pipeline system. It is to be noted that the techniques described herein may be applicable to a variety of transport systems in addition to or alternative to pipeline systems. Indeed, fluid vessels, contained transport systems, containers, and the like, may be inspected using the techniques described herein.

In certain embodiments, an inspection system includes a transducer disposed inside pipeline or transport system suitable for sending a signal from inside a vessel (e.g., pipe)

so that the signal traverses a vessel wall to and outside surface of the vessel. Reflection of the transmitted signal or energy would include some dependency based on the nature of the external environment (e.g., in form of a refraction index) and would appear in data as forms of different attenuations in amplitude over several echo pulses. A reference data level may be generated from data sets aggregated from all sensors receiving a signal echo. Conditions at a given location may then be characterized and used in comparison with other locations and may also be used as predictor of external environment conditions. Accordingly, an environmental assessment of conditions external to the pipeline system, including pipe coating status, may be derived more accurately.

Turning now to the drawings and referring to FIG. 1, the figure illustrates a cross section block diagram of an embodiment of a portion of pipeline system 8 having one or more pipes 10. The pipes 10 may include non-ferrous and/or ferrous pipe. Also shown is a pipeline inspection system 12 disposed in the interior of the pipe 10, useful in inspecting the pipeline system 8. For example, the pipeline inspection system 12 may be inserted during inline inspection operations and subsequently propelled though the pipeline system 8 by pressure of a fluid 14 flowing through the pipeline system 8. The fluid 14 may include liquids and/or gases, for example, hydrocarbonic fluids used in oil and gas industries, such as petroleum, petroleum distillates, natural gas, propane, and so on. However, the fluid 14 need not be limited to the aforementioned examples, and may include any fluid that traverses the pipeline system 8 with suitable pressure.

As the inspection system 12 moves through the pipeline system 8, an environmental assessment may be made. For example, certain undesired conditions 16 of the pipeline system 8 may be detected. For example, wet soil, dry soil, and other properties of a medium 17 (e.g., soil, gravel, water, rock, and the like) surrounding the pipe 10 may be detected. Likewise, a condition of a coating 19 disposed on outside surfaces of walls 18 of the pipe 10, corrosion, pitting, ablative conditions, and so on, may be detected. As further described herein, the inspection system 12 may include a pulse echo system 20. Other inline inspection (ILI) systems 22, 24 may be used. For example, the systems 22, 24 may include high resolution caliper systems, magnetic flux leakage (MFL) systems, acoustic resonance (AR) systems, or a combination thereof. In certain embodiments, the systems 20, 22, 24 may be combined into a single package or unit, for example, for overall compactness and length reduction. Each of the systems 20, 22, 24, may include a sensing package 26, 28, 30, one or more processors 32, 34, 36, and one or more memory 38, 40, 42, respectively. The sensing package 26 may be suitable for transmitting ultrasonic energy or signals through the pipe 10 and for detecting the conditions 16 via sensed echo pulses, as described in more detail below. The sensing packages 28, 30 may include mechanical sensors, electronic sensors and/or software suitable for applying ILI sensing techniques, such as the aforementioned MFL, AR, and/or high resolution caliper. The processor 32, 34, 36 may be suitable for executing computer code or instructions stored in the memories 38, 40, 42.

In certain embodiments, the systems 20, 22, and 24 may be removable and/or replaceable. For example, it may be desired to first capture only pulse echo data, so an inspection run may include only the pulse system 20. A second inspection run may then be performed at a later time (e.g., minutes, hours, days, weeks later) with the inspection system 12 carrying any one of the MFL, AR, high resolution caliper, or combination thereof. The inspection system 12 may provide for better predictive characteristics of environments external to the pipe 10, as well as the coating 19 than other techniques, as well as increased confidence and reliability of detection and characterization of particular product leakages that may be of concern for the delivery of product traversing the pipe 10. The physical configuration of the combined inspection system 12 may not be radically different than current conventional tools. Indeed, in some embodiments, the techniques described herein may provide for a software upgrade of certain existing hardware, e.g., via Flash upgrade, to enable the improved environmental assessment.

Figure 2:
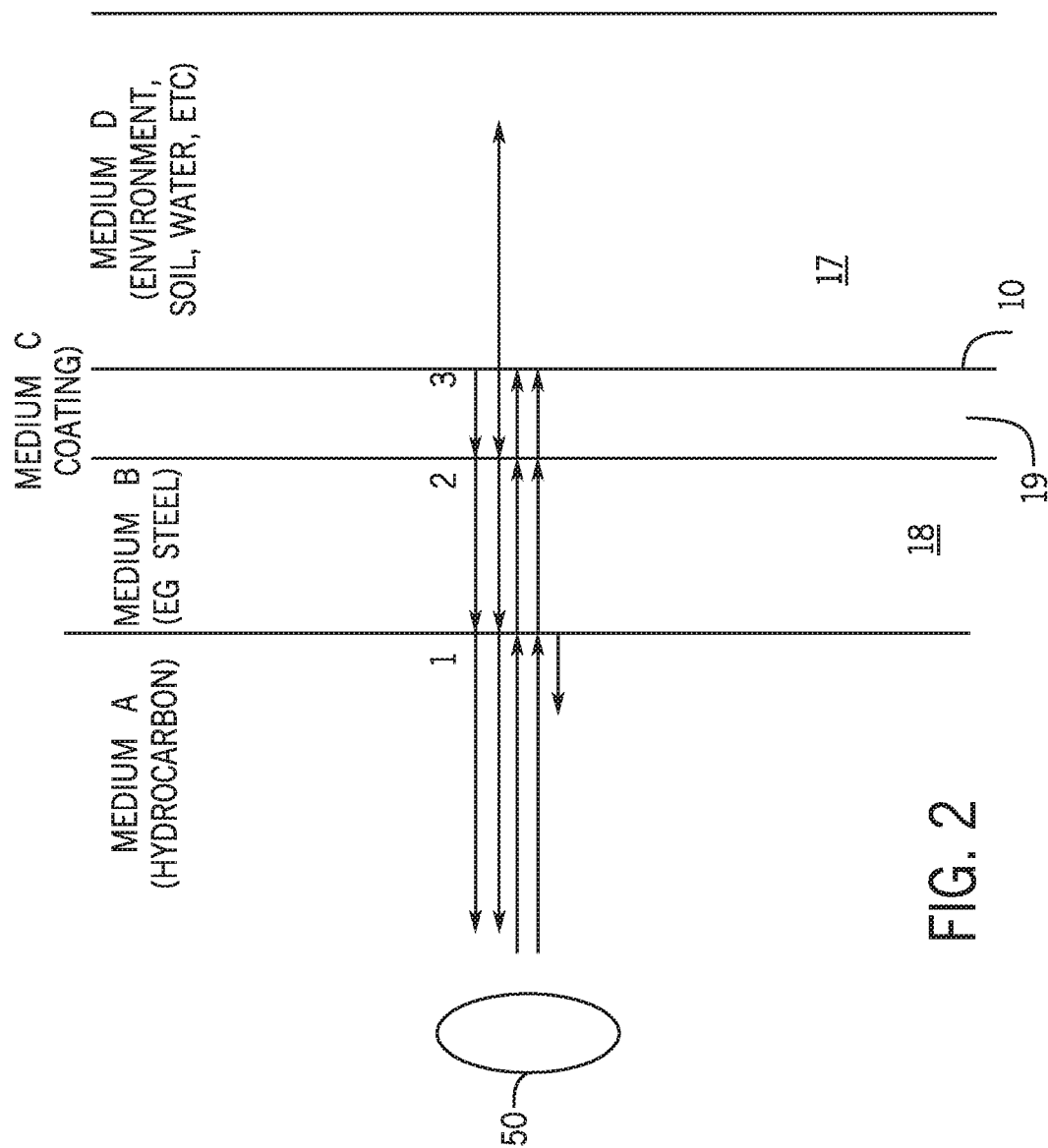
FIG. 2 is a cross-sectional view of an embodiment of a region of interest for observation via a single sensor.

FIG. 2 illustrates an embodiment of set of interfaces 1, 2, 3 depicting a single ultrasonic transmitter/sensor system 50 that may be included in the sensing package 26 shown in FIG. 1. In time of flight pulse-echo based ultrasonic (UT) inspection, a compression wave sound beam may be generated through the use of a finite ultrasonic pulse wave transmitted via the system 50. Through wave physics, it can be shown that as the beam energy hits an interface surface (e.g., interface 1) separating different mediums (e.g., each medium having differing sonic properties), energy will be reflected (echoed) and transmitted through the interface.

In the case of multiple layer targets with multiple interfaces, as shown in the figure, echo responses may be detected and recorded for each of the interfaces 1, 2, and 3 as pulse events interact with the respective interfaces. For example, at interface 2 between A and B mediums (e.g., wall 18 and coating 19), pulse waves may also cause a reflection echo and some transmission of energy. Likewise, a reflection echo and energy transmission may occur at interface 3 separating medium C 19 from medium D 17. Relative ratios of amplitudes of reflection and transmission energy may be based upon relative differences between the mediums at each interface 1, 2, 3, e.g., transmit "T" and reflection "R" ultrasound boundary conditions, as described in more detail below.

To derive a UT wall 18 thickness measurement, the reflection pulse time for flight from interface 1 and 2 maybe be used to establish the wall 18 thickness based upon a speed of sound reference for medium b (e.g., wall 18's composition). Some energy continues to reflect within interface 1 and 2, and between interface 2 and 3, back to the probe until fully dissipated. Visualization of this amplitude reflection vs. time behavior as received at the UT probe 50 is generally referred to as an A-Scan.

Figure 3:
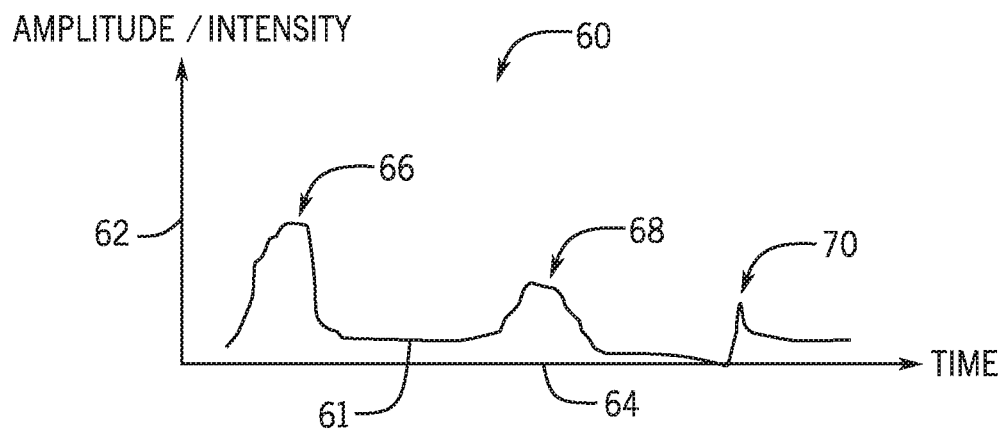
FIG. 3 is an embodiment of an amplitude versus time graph for a single signal.

FIG. 3 is a graph 60 illustrating embodiments of an amplitude versus time of certain reflections show in FIG. 2. More specifically, the graph 60 includes a y-axis 62 representative of an amplitude or intensity of a signal 61 received via sensors included in the system 26, and an x-axis 64 representative of time of receipt of the signal. The graph also shows three peaks 66, 68, and 70. Peak 66 includes a reflection signal from interface 1's inner surface to probe system 50 and back. Peak 68 includes a reflection signal from within the medium B, between interfaces 1 and 2, 2-1, and back to the probe 50. Peak 70 includes a residual reflection signal back from the reflection shown on peak 68, then between interfaces 1-2, 2-1, and then back to the probe 50. By analyzing multiple signals, an improved environmental scan may be derived.

The identification of the 1-2, 2-3, interface events and relative amplitude/energy changes provides insight to the interface 1, 2, 3 conditions, and thus, may be a source of insight to the sonic properties of the external environment. Individually, a single sensor and firing sequence may not provide the resolution or consistency to establish the outer boundary interface conditions. The techniques described herein include the use of a plurality of sensors 50 (e.g., pulse echo sensors), which may be disposed circumferentially inside of the pipe 10. Each sensor 50 may record A-scans simultaneously for pulse-echo information related to the wall 18 thickness measurement, but also as relative amplitude changes due to the medium C (e.g., coating 19) and medium D (e.g., medium 17). In another embodiment, a Phased Array ultrasonic probe(s) may be used in lieu of or additional to the plurality of circumferentially disposed sensors 50, in a wall 18 measurement firing configuration.

Data acquisition for the system 20 may occur at high linear repetition as the system 20 moves through the pipe 10 (e.g., sensors 50 may be moving past the point on the pipe wall 18, and thus, full pipe joint and full pipeline 8 information may be collected). With the techniques described herein, those changes that infer the medium C sonic properties relative to the medium B sonic properties would be computed and characterized statistically for each joint and/or region of interest. Using such aggregated amplitude changes from all sensors, a characteristic profile of the relative medium C/D sonic properties to medium B sonic properties may be generated and then used for reference or predictive purposes. Certain references may be useful. Relative reference—checks other areas of similar characterization profile versus an expected profile. Absolute reference— checks and calibrates areas of similar characterization using the independent records of the right of way/as-built information on record of for pipeline system 8 operator or other independent calibration reference (e.g. presence of external oil).

Once characterized at aggregated pipe 10 joint scale, a search for localized statistical anomalies that would represent coating disbands and/or different external conditions may be derived. Locations with identified or predetermined characteristic response for the medium C/D may be flagged for potential unwanted environmental state (e.g. coating dis-bond in saturated water, presence of oil surrounding pipe indicating a leak). Each sensor 50 may have its own calibration reference for intensity, focus, and responsiveness, to known standards, hence amplitudes may be normalized to other sensors 50 as needed.

Figure 5:
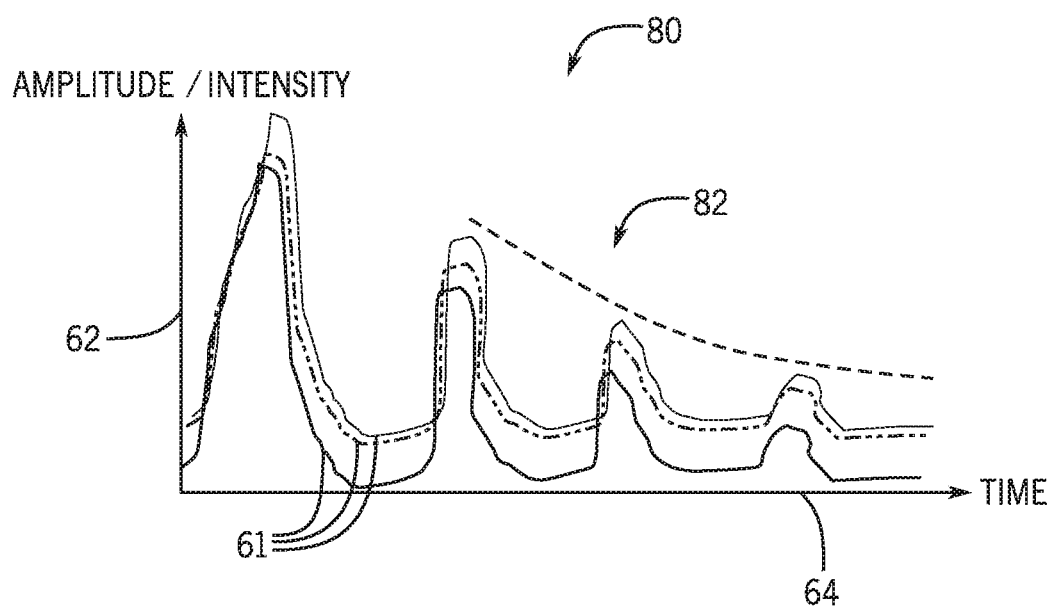
FIG. 5 is an embodiment of an amplitude versus time graph for a plurality of signals.
Figure 4:
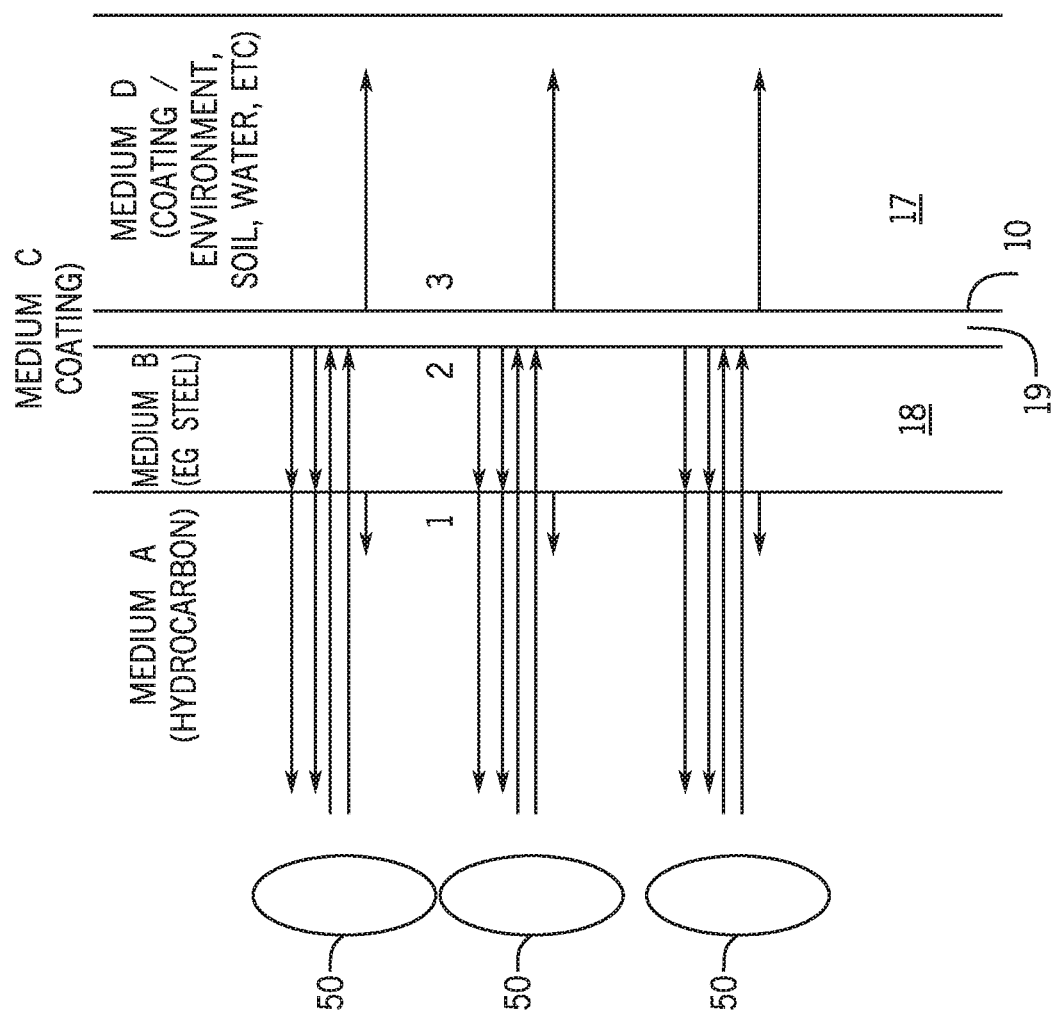
FIG. 4 is a cross-sectional view of an embodiment of a region of interest for observation via a combination of sensors.

FIGS. 4 and 5 illustrate embodiments of a plurality of sensors 50 and signals 61 respectively. More specifically, FIG. 4 illustrates an embodiment of a plurality of sensors 50 each sensor 50 independently recording A-scans. In the depicted embodiment, the sensors 50 may record A-scans approximately simultaneously, thus providing for pulse-echo information related to the wall 18 thickness measurement, but also as relative amplitude changes due to the medium C (e.g., coating 19) and medium D (e.g., medium 17). As shown in FIG. 5, the signals 61 from respective sensors 50 may be combined in single graph 80. An amplitude change profile 82 shown as a dashed curve following peaks of the signals 61 may be derived, representative of changes that infer, for example, medium C sonic properties relative to the medium B sonic properties. Such changes would be computed and characterized statistically for each joint and/or region 16 of interest.

Figure 6:
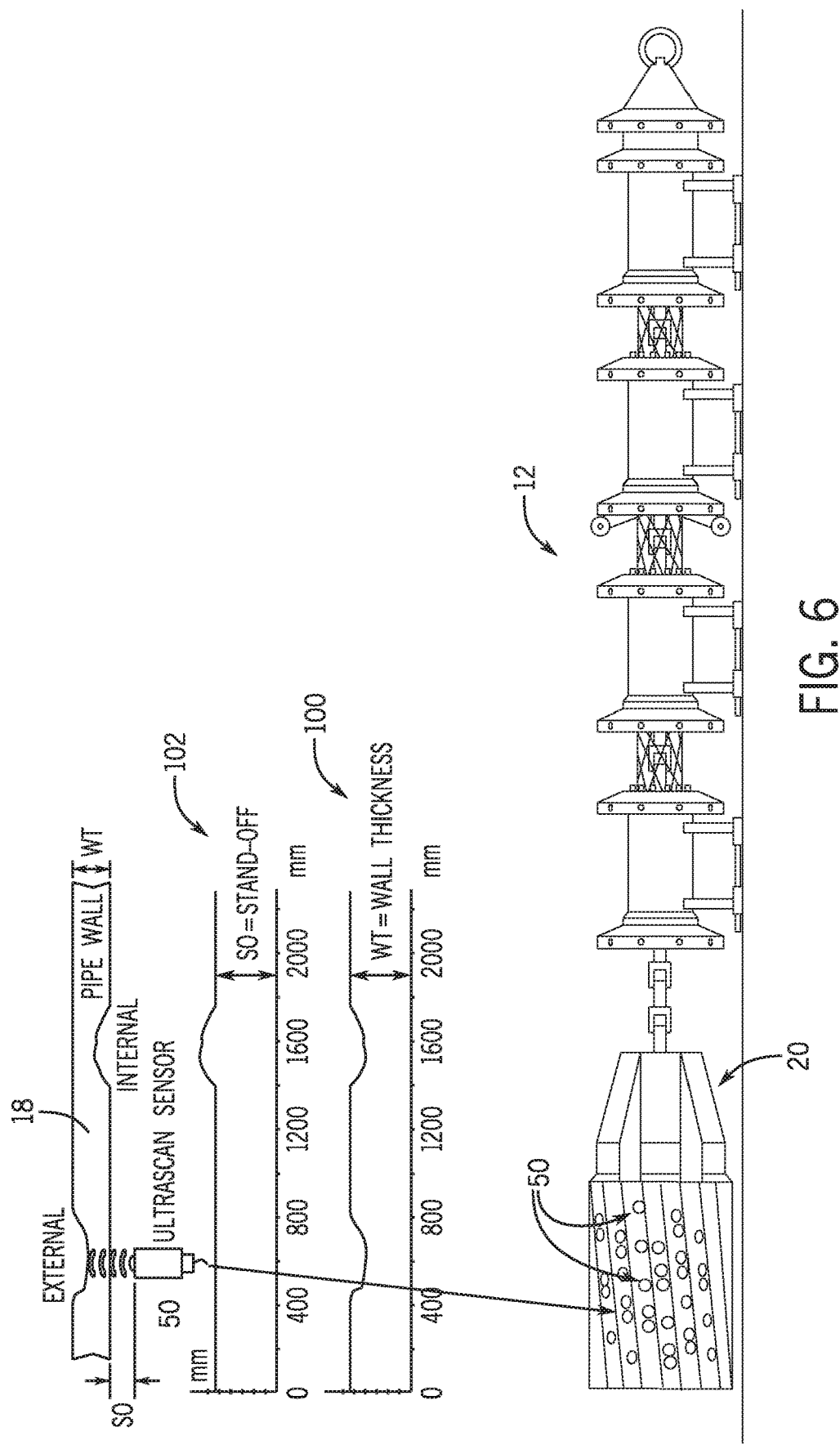
FIG. 6 is a view of an embodiment of an inspection system having a plurality of sensors disposed circumferentially about an axis.

FIG. 6 illustrates an example system 20 having a plurality of sensors 50. As illustrated each sensor 50 may transmit and/or observe energy (e.g., UT energy) independently, and in a preferred embodiment, simultaneously. Each sensor may observe the walls 18 and derive, for example, wall 18 thickness measurements 100 and/or offset measurements 102. In some embodiments, the hardware/software for the system 20 may include systems available from General Electric Company, of Schenectady, N.Y., such as an UltraScan WM tool. The techniques described herein may be "flashed" onto a processor of the WM tool, e.g., processor 32. The flash upgrade may then provide software suitable for deriving certain ratios, including relative amplitude changes due to certain mediums, e.g., the medium C and medium D (e.g., medium 17).

Figure 7:
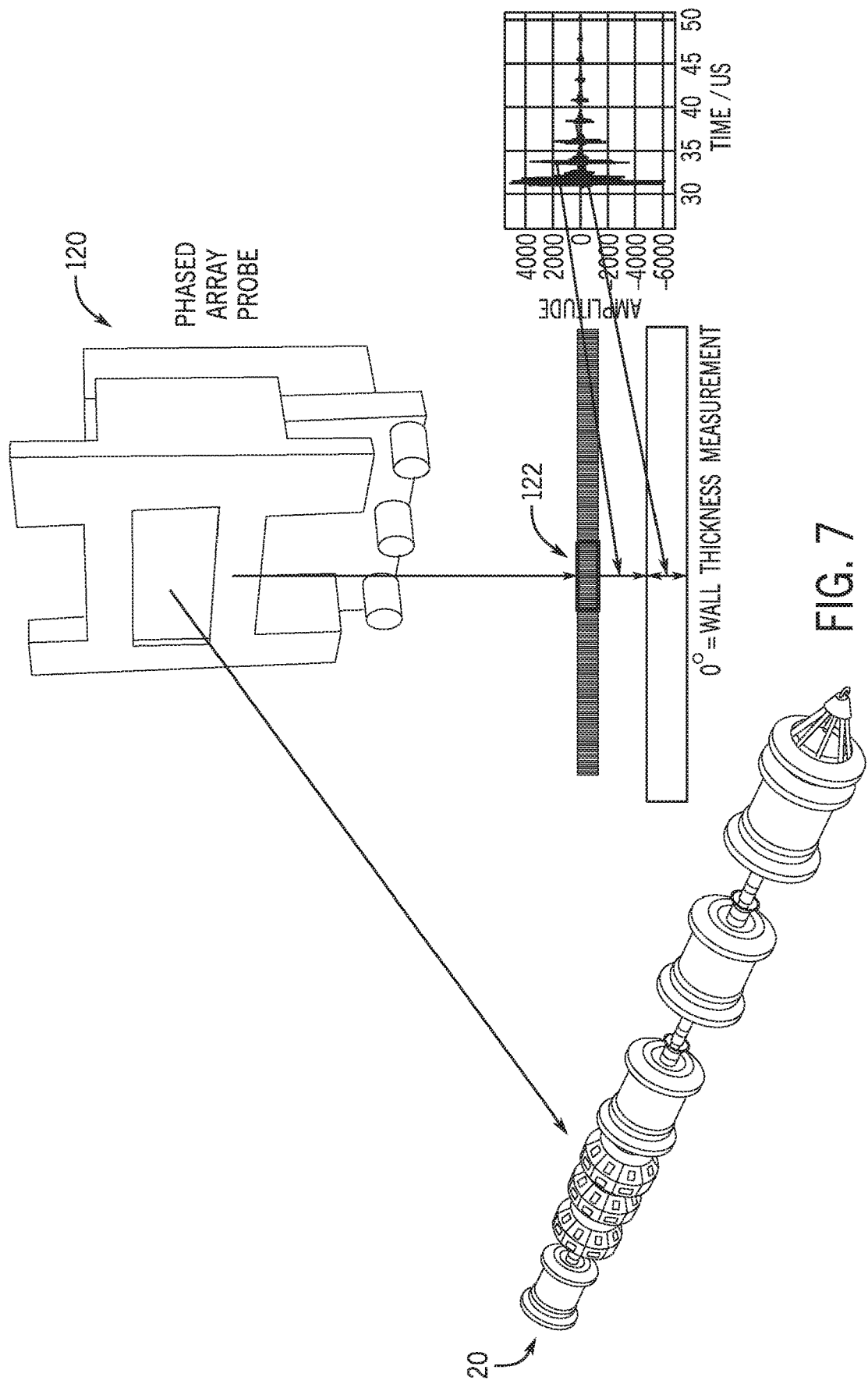
FIG. 7 is a view of an embodiment of an inspection system having a phased array system and virtual sensors.

FIG. 7 illustrates an example system 20 having a phased array probe 120 suitable for implementing the techniques described herein. More specifically, the probe 120 may provide the equivalent of a plurality of virtual sensors 50, which may be configured to fire in a wall measurement time of flight mode. Each virtual sensor 122 may fire selectively within the full array 120, for example, to generate a 0° incident wave, thus providing for a wall measurement pulse echo. Full circumferential coverage may be provided by use of multiple probes, each using virtual sensors 122 across the full width of each array 120. In some embodiments, the hardware/software for the system 20 may include systems available from General Electric Company, of Schenectady, N.Y., such as an UltraScan DUO Phase Array Ultrasonic Pipeline Inspection Tool.

Figure 8:
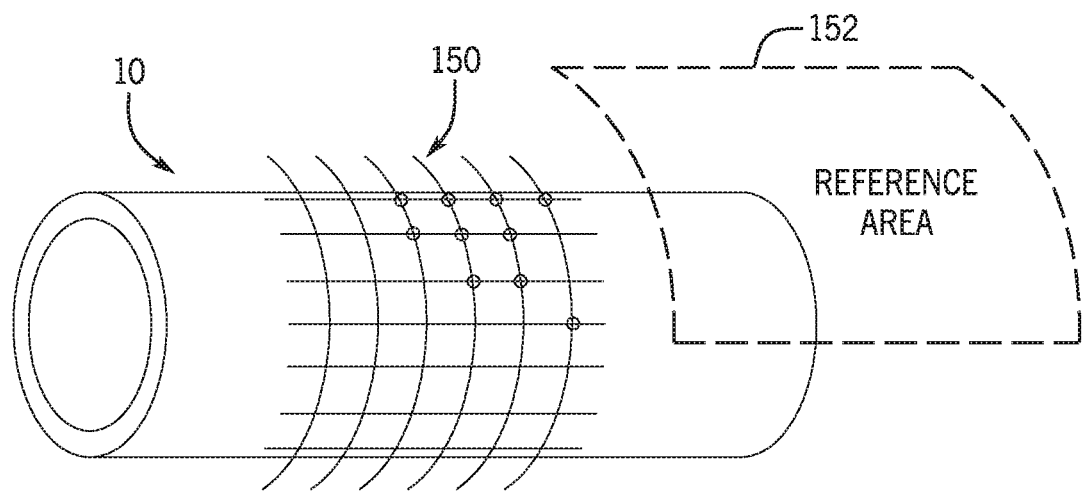
FIG. 8 is a perspective view of an embodiment of a pipe and a reference inspection area.

FIG. 8 is a perspective view of the pipe 10 and a sensing array 150 that may be provided via the sensors 50. A reference area 152 is also shown, depicting an area of observation. As mentioned earlier, a plurality of sensors 50 may be used. In one embodiment, 20, 30, 40, 50, or more sensors 50 may be used.

Figure 9:
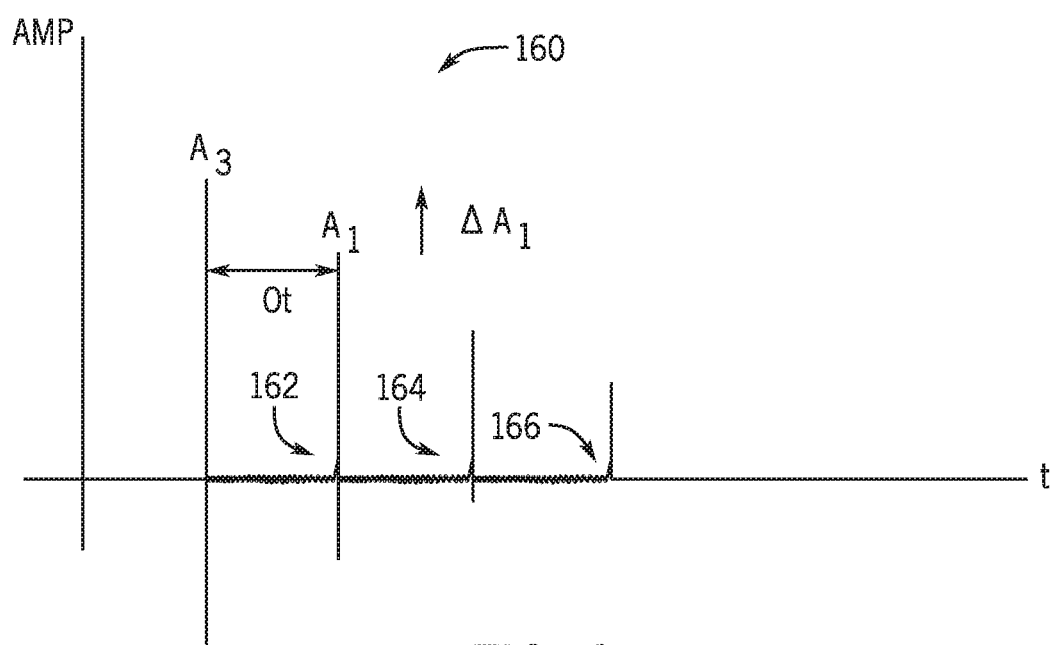
FIG. 9 is an embodiment of a graph showing various amplitude curves.

FIG. 9 is an amplitude versus time curve showing how different curves 162, 164, 166 mean different medium environments. Amplitude is A, and looking at different amplitudes of a pulse in different environments may show changes in amplitudes based on the environment. Amplitude levels can be characterized as a profile of a given environment. Different curves 162, 164, 166 may thus imply different mediums and/or environments.

Figure 10:
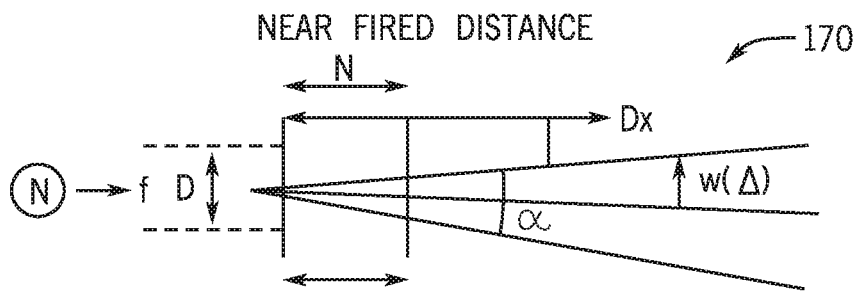
FIG. 10 is an embodiment of a near field distance graph.
Figure 11:
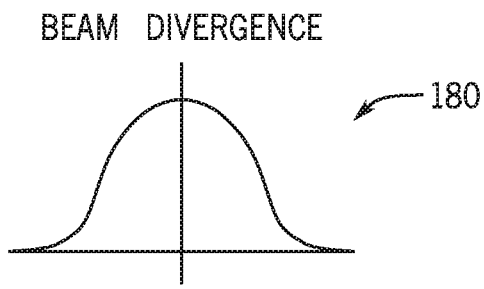
FIG. 11 is an embodiment of a beam divergence graph.

FIG. 10 depicts a focal capability of a sensor, and near field distance N. The size and nature of a fired ultrasound beam is dependent on the sensor face, frequency, and velocity of the medium used to transport the beam. More dense mediums result in higher velocities. Div is a divergence of the beam as the beam spreads.

$$N = \frac{D^2 F}{4V}$$

where F is frequency and V is the ultrasonic velocity. FIG. 11 illustrates a beam width diagram 180 suitable to derive width W based on ultrasonic velocity V, Distance D, frequency F, and time t. Accordingly, the $$\text{width } W_t = \frac{V_t}{\sqrt{\left(\frac{DF}{1.2V}\right)^2 - 1}}.$$

Figure 12:
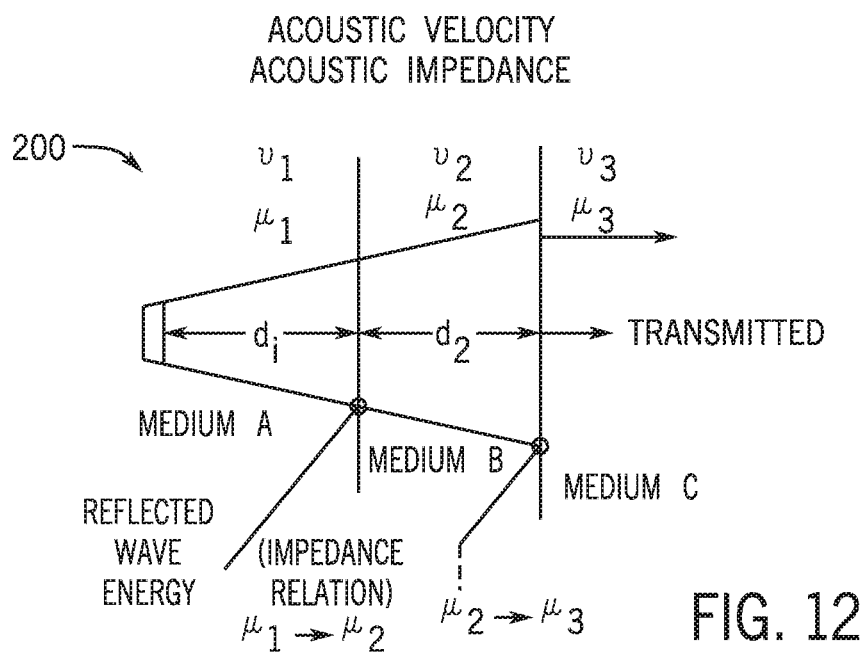
FIG. 12 is an embodiment of side view of a region of interest and acoustic impedance.

FIG. 12 depicts an example diagram 200 suitable for deriving a reflection coefficient or $$R_{12} = \left[\frac{\mu_2 - \mu_1}{\mu_3 - \mu_1}\right]^2$$

where the amount of energy reflecting from a given interface (e.g., 12 may denote interfaces 1 and 2) when compared to the amount of energy contacting the interface is dependent on medium A, B, C properties. μ is an impedance measure of sound transmission, akin to a resistivity value of a medium to sound transmission. Accordingly, $\mu_1$ corresponds to medium A, $\mu_2$ to medium B, and $\mu_3$ to medium C. Certain energy may escape through medium C, and the energy may be approximately equal to $T_{12}=[1-R]$. Because of varying properties in each medium A, B, C, each medium may include varying velocities $V_1$, $V_2$, $V_3$.

The reflective coefficient Ru may then be used, for example, via a lookup table, to determine conditions 16 and/or provide the environmental assessment. For example, once a value for Ru is found, the value may be used to look up what type of soil, leakage, rock properties, coating status, and so on, may be present. The μ may be derived, for example, based on certain time resulting from velocities of the mediums A, B, C.

Figure 13:
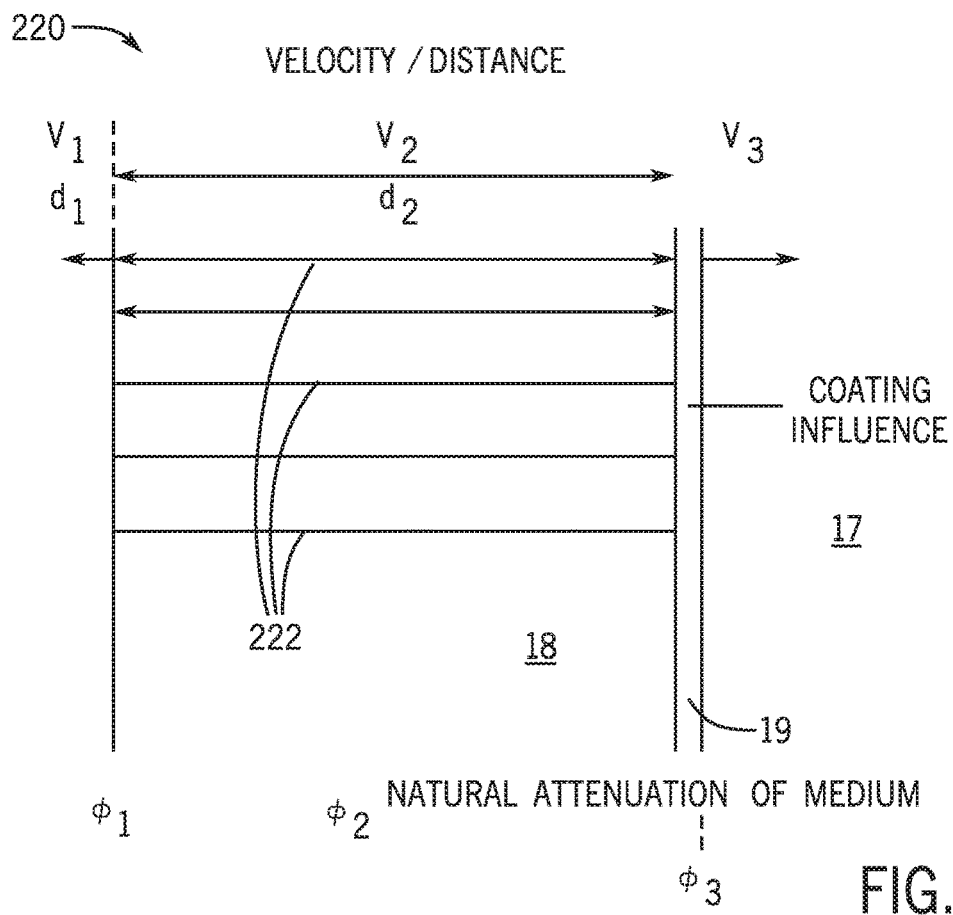
FIG. 13 is an embodiment of side view of a region of interest and certain pulse echoes.

FIG. 13 shows an embodiment of a graph 220 showing energy pulses bouncing between mediums, and gate length calculations. As pulses 222 bounce back and forth, traversing the mediums or materials 17, 18, 19, each material will provide for a different ultrasonic velocity V, as shown. A delta or change in time t may be derived using the formula $$\Delta t = \frac{2d_2}{V_2} + \frac{d_1}{\sqrt{1}}$$

where $V_2$ is the ultrasonic velocity at medium 18, and $d_2$ is the distance over the medium 18, and $d_1$ is the distance over medium 17.

Figure 14:
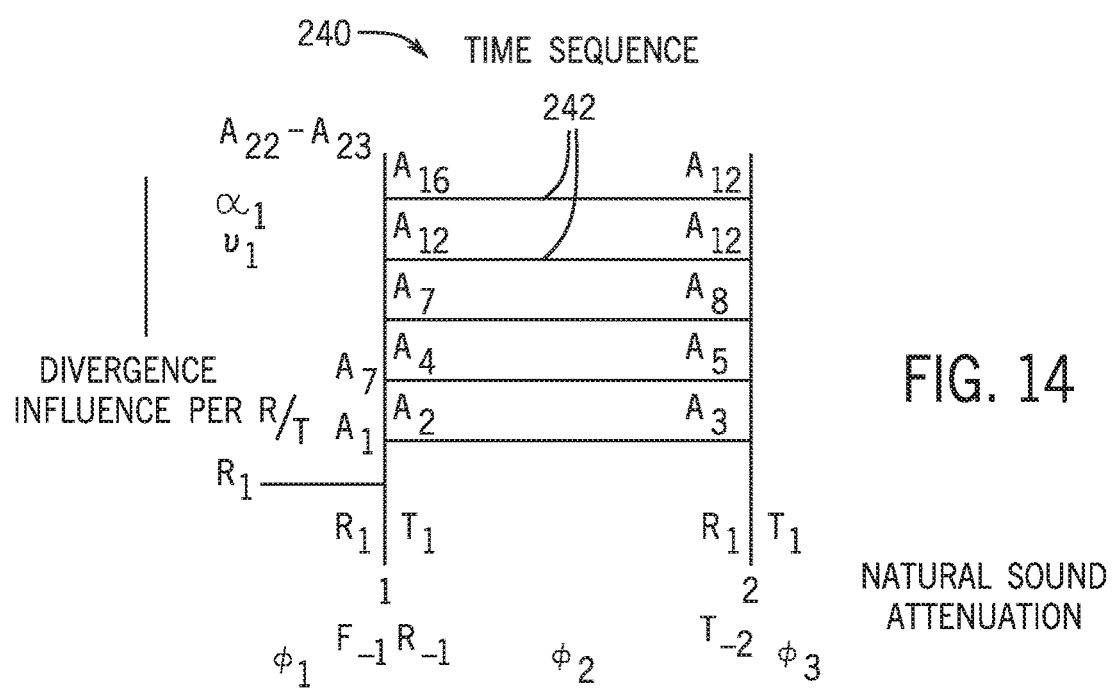
FIG. 14 is an embodiment of side view of a region of interest and certain other pulse echoes.

Gate length calculations enable the sensors 50 to listen with sufficient time t so as to capture the pulse echoes. FIG. 14, related to FIG. 13, illustrates a graph 240 series of amplitudes 242 and amplitude calculations. As illustrated, the amplitudes 242 may change during subsequent pulse echoes as the pulses bounce of the different mediums. Amplitude calculations are interdependent based on the reflection ratio R, as described earlier (e.g., $R_{12}$). For example, an initial surface reflection pulse amplitude $A_x=R_1$ [$A_1$] where R1 is the first reflection. Accordingly, amplitude received $$A_{rce'd} = A_x e^{-\phi\left(\frac{d_1}{\sqrt{1}}\right)}.$$

Second pulse amplitudes, $A_7=T_1[A_1]$, and $$A_8 = A_7 e^{-\Phi_1\left(\frac{d_1}{\sqrt{1}}\right)}.$$

Third pulse amplitudes $$A_{15} = A_{14} e^{-\Phi_1\left(\frac{d_1}{\sqrt{1}}\right)}, A_{22} = A_{21} e^{-\phi\left(\frac{d_1}{\sqrt{1}}\right)}.$$

Figure 15:
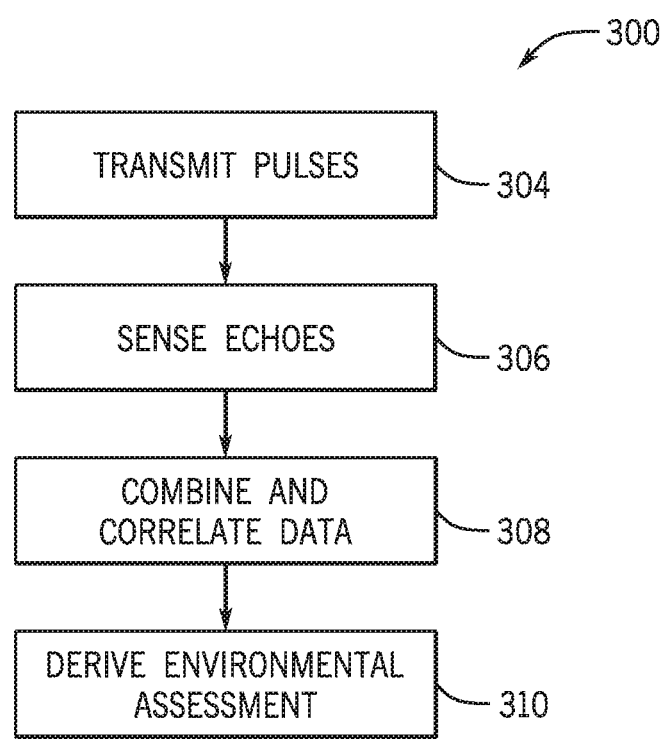
FIG. 15 is an embodiment of a process suitable for combining data from a plurality of sensors to derive an environmental assessment.

Turning now to FIG. 15, the figure is a flowchart of an embodiment of a process 300 that may be used to combine data from multiple sensors 50 to provide for improved inspections of the pipeline system 8. The process 300 may be implemented as computer software or instruction executable via processors and stored in memory. In the depicted embodiment, the process 300 may first transmit one or more UT pulses (block 304). As described earlier, the pulse may echo through various mediums. The process 300 may then sense the various pulse echoes (block 210) through a plurality of sensors 50. For example, the pulses may bounce between various medium types, at varying velocities based on properties of the medium (e.g., densities, humidity) and sensed as they are received by the sensors (50).

The process 300 may then combine the various echo data (block 308). The combination may result in derivations of amplitudes and various reflection ratios (e.g., $R_{12}$). Based on the derivations, an environmental assessment may be derived (block 310). For example, lookup tables, databases, and so on, may be used to correlate the amplitudes and/or ratios with certain conditions 16, such as oil, water, dry soil, wet soil, rocks, coating status (e.g., worn coating, coating thickness).

This written description uses examples to disclose the disclosed subject matter, including the best mode, and also to enable any person skilled in the art to practice the disclosed subject matter, including making and using any devices or systems and performing any incorporated methods. The patentable scope of the disclosed subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for inspecting pipe, comprising:
positioning a pipe inspection system within a pipe;
advancing the pipe inspection system within the pipe;
transmitting a plurality of ultrasound pulses through a plurality of interfaces present at a wall of the pipe, a coating on an exterior surface of the pipe, and a material in which the pipe is located, wherein the plurality of ultrasound pulses are transmitted from within the pipe by a removable inline inspection systems included in the pipe inspection system;
receiving echoes via at least three sensors of a plurality of sensors, based on the plurality of ultrasound pulses, wherein a first sensor of the at least three sensors is configured in a first transmitter/sensor system of a first removable inline inspection system, the first sensor performing a first pulse echo sensing technique and wherein a second sensor of the at least three sensors is configured in a second transmitter/sensor system of a second removable inline inspection system, the second sensor performing a second pulse echo sensing technique different from the first pulse echo sensing technique;
combining echo data from the at least three sensors; and
deriving an environmental assessment based on the combining of the echo data.

2. The method of claim 1, wherein the environmental assessment comprises a pipe coating assessment.

3. The method of claim 1, wherein deriving the environmental assessment comprises deriving a reflective coefficient.

4. The method of claim 3, wherein deriving the environmental assessment comprises comparing the reflective coefficient to a lookup table.

5. The method of claim 1, wherein each of the at least three sensors independently records an A-scan, and wherein each A-scan of the at least three sensors is combined to derive the environmental assessment.

6. The method of claim 5, wherein each of the at least three sensors independently records the A-scan approximately simultaneously with each other.

7. The method of claim 1, wherein the at least three sensors comprise virtual sensors derived via a phased array probe.

8. The method of claim 1, wherein receiving echoes via the at least three sensors comprises receiving a first set of echoes of the plurality of echoes at a first time and then receiving a second set of echoes of the plurality of echoes at a second time, wherein the second time is minutes, hour, days, weeks, or a combination thereof, after the first time.

9. A system for inspecting pipe, comprising:
a plurality of removable inline inspection systems configured to operate within the pipe as the system travels within the pipe, at least one of the removable inline inspection systems including;
a transmitter/sensor system including a plurality of sensors; and
a processor configured to cause the transmitter/sensor system to:
transmit an ultrasound pulse through a plurality of interfaces present at a wall of the pipe, a coating on an exterior surface of the pipe, and a material in which the pipe is located, wherein the ultrasound pulse is transmitted from within the pipe;
receive echo data via at least three sensors of the plurality of sensors, based on the ultrasound pulse, wherein a first sensor of the at least three sensors is configured in a first transmitter/sensor system of a first removable inline inspection system, the first sensor performing a first pulse echo sensing technique and wherein a second sensor of the at least three sensors is configured in a second transmitter/sensor system of a second removable inline inspection system, the second sensor performing a second pulse echo sensing technique different from the first pulse echo sensing technique;
combine the echo data from the at least three sensors; and
derive an environmental assessment based on the combining of the echo data.

10. The system of claim 9, wherein the plurality of sensors are arranged circumferentially about an axis.

11. The system of claim 9, wherein the transmitter/sensor system comprises a phased array probe and the plurality of sensors each comprises a virtual sensor.

12. The system of claim 9, wherein the plurality of removable inline inspection systems includes additional removable inline inspection systems comprising an acoustic resonance sensor configured in the transmitter/sensor system of a second removable inline inspection system of the plurality of removable inline inspection systems, or a magnetic flux leakage sensor configured in the transmitter/sensor system of a third removable inline inspection system of the plurality of removable inline inspection systems, or a combination thereof.

13. The system of claim 9, wherein the plurality of sensors comprises at least three pulse echo sensors and wherein each of the at least three pulse echo sensors independently records an A-scan.

* * * * *